United States Patent
Moghe et al.

(10) Patent No.: US 10,369,893 B2
(45) Date of Patent: Aug. 6, 2019

(54) INTELLIGENT VEHICLE CONTROL FOR WIRELESS POWER TRANSFER (WPT)

(71) Applicant: Cisco Technology, Inc., San Jose, CA (US)

(72) Inventors: Ashok Krishnaji Moghe, Pleasanton, CA (US); John George Apostolopoulos, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 8 days.

(21) Appl. No.: 15/790,687

(22) Filed: Oct. 23, 2017

(65) Prior Publication Data
US 2019/0039470 A1 Feb. 7, 2019

Related U.S. Application Data

(60) Provisional application No. 62/541,816, filed on Aug. 7, 2017.

(51) Int. Cl.
*B60L 11/18* (2006.01)
*H02J 7/02* (2016.01)
(Continued)

(52) U.S. Cl.
CPC ......... *B60L 11/1829* (2013.01); *B60L 11/182* (2013.01); *G05D 1/0212* (2013.01);
(Continued)

(58) Field of Classification Search
CPC . H02J 50/90; H02J 50/10; H02J 7/025; B60L 11/182; G05D 1/0212; H01M 10/44
(Continued)

(56) References Cited

U.S. PATENT DOCUMENTS 9,365,128 B2 * 6/2016 Sarkar et al. ............. B60L 3/04
9,371,007 B1 * 6/2016 Penilla et al. ...... B60L 11/1848
(Continued)

OTHER PUBLICATIONS

Deflorio, et al., "Dynamic charging-while-driving systems for freight delivery services with electric vehicles: Traffic and energy modelling", Transportation Research Part C: Emerging Technologies, vol. 81, Aug. 2017, pp. 342-362, Elsevier B.V. (Abstract Only).
(Continued)

*Primary Examiner* — Sun J Lin
(74) *Attorney, Agent, or Firm* — Behmke Innovation Group LLC; James Behmke; Stephen D. LeBarron

(57) ABSTRACT

In some embodiments, a device in a network receives vehicle characteristic data regarding one or more autonomous vehicles. Each autonomous vehicle of the one or more autonomous vehicles is equipped with a vehicle-based charging coil configured to receive electrical power from a ground-based charging coil of a wireless power transfer (WPT) system. The device, based on the received vehicle characteristic data, identifies one or more ground-based charging coils of the WPT system available to provide power to the one or more autonomous vehicles. The device determines driving parameters for the one or more autonomous vehicles to optimize power transfer from the one or more ground-based charging coils to the one or more autonomous vehicles. The device sends the driving parameters to the one or more autonomous vehicles to control movement of the one or more autonomous vehicles.

20 Claims, 13 Drawing Sheets

(51) Int. Cl.
  *H01M 10/44* (2006.01)
  *H02J 50/90* (2016.01)
  *G05D 1/02* (2006.01)
  *H02J 50/10* (2016.01)
(52) U.S. Cl.
  CPC ............. *H01M 10/44* (2013.01); *H02J 7/025* (2013.01); *H02J 50/10* (2016.02); *H02J 50/90* (2016.02)
(58) Field of Classification Search
  USPC ......................................................... 320/109
  See application file for complete search history.

(56) References Cited

U.S. PATENT DOCUMENTS

| | | | | |
|---|---|---|---|---|
| 9,608,465 | B2* | 3/2017 | Keeling et al. | B60L 11/1809 |
| 9,637,014 | B2* | 5/2017 | Schneider et al. | H02J 50/12 |
| 9,941,708 | B2* | 4/2018 | Keeling et al. | H02J 5/005 |
| 9,975,441 | B2* | 5/2018 | Huang et al. | H01F 38/14 |
| 2011/0221387 | A1* | 9/2011 | Steigerwald et al. | |
| | | | | B60L 11/182 |
| | | | | 320/108 |
| 2014/0021908 | A1* | 1/2014 | McCool et al. | B60L 11/182 |
| | | | | 320/108 |
| 2014/0217966 | A1* | 8/2014 | Schneider et al. | H02J 50/12 |
| | | | | 320/108 |
| 2015/0217655 | A1* | 8/2015 | Sankaran et al. | B60L 11/182 |
| | | | | 701/22 |
| 2016/0023557 | A1 | 1/2016 | Dimke et al. | |
| 2016/0068069 | A1* | 3/2016 | Percebon et al. | B60L 11/182 |
| | | | | 307/104 |
| 2016/0318413 | A1* | 11/2016 | Roehrl et al. | B60L 11/182 |
| 2016/0372955 | A1* | 12/2016 | Fackelnneier et al. | |
| | | | | H01Q 9/0485 |

OTHER PUBLICATIONS

Karakitsios, et al., "An Integrated Approach for Dynamic Charging of Electric Vehicles by Wireless Power Transfer—Lessons Learned from Real-Life Implementation", SAE Int. J. Alt. Power. 6(1):15-24, 2017, SAE International. (Abstract Only).
Li, et al., "FADEC: Fast Authentication for Dynamic Electric Vehicle Charging", 2013 IEEE Conference on Communications and Network Security (CNS), 2013, 2 pages, IEEE.
Maglaras, et al., "Dynamic wireless charging of electric vehicles on the move with Mobile Energy Disseminators", (IJACSA) International Journal of Advanced Computer Science and Applications, vol. 6, No. 6, 2015, 13 pages, IJACSA.
Maglaras, et al., "Social Aspect of Vehicular Communications", EAI Endorsed Transactions on Cloud Systems, vol. 1, Issue 1, e6, 2015, 10 pages, ICST.
Miller, et al., "ORNL Experience and Challenges Facing Dynamic Wireless Power Charging of EV's", IEEE Circuits & Systems Magazine, Feb. 2015, 22 pages, IEEE.
Sarker, et al., "An Efficient Wireless Power Transfer System to Balance the State of Charge of Electric Vehicles", 2016 45th International Conference on Parallel Processing (ICPP), 10 pages, IEEE.
Wei, et al., "Optimal Traffic-Power Flow in Urban Electrified Transportation Networks", IEEE Transactions on Smart Grid (vol. 8, Issue: 1, Jan. 2017), 2017, pp. 84-95, IEEE. (Abstract Only).
Yan, et al., "CatCharge: Deploying wireless charging lane in metropolitan scale through categorization and clustering of vehicle mobility", 2016 IEEE 24th International Conference on Network Protocols (ICNP), 2 pages, 2016, IEEE.

* cited by examiner

INTELLIGENT VEHICLE CONTROL FOR WIRELESS POWER TRANSFER (WPT)

RELATED APPLICATION

This application claims priority to U.S. Provisional Patent Appl. No. 62/541,816, filed on Aug. 7, 2017, entitled INTELLIGENT VEHICLE CONTROL FOR WIRELESS POWER TRANSFER (WPT), by Moghe, et al., the contents of which are incorporated herein by reference.

TECHNICAL FIELD

The present disclosure relates generally to computer networks, and, more particularly, to intelligent vehicle control for wireless power transfer (WPT) systems.

BACKGROUND

Wireless power transfer (WPT) is an emerging technology that has proven to be effective for charging vehicles, such as electric vehicles (EVs). In a typical WPT setup for EVs, a ground-based coil is supplied power, thereby inducing a current remotely in a second, vehicle-based coil located at the bottom of the EV. In a dynamic WPT scenario, a moving EV can travel over the ground-based coils where energy is transferred to the cars as they pass over the coils. To improve energy efficiency and/or keep the level of electromagnetic radiation low, some implementations may (only) energize the ground-based coils when the EV is on top of the coils.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
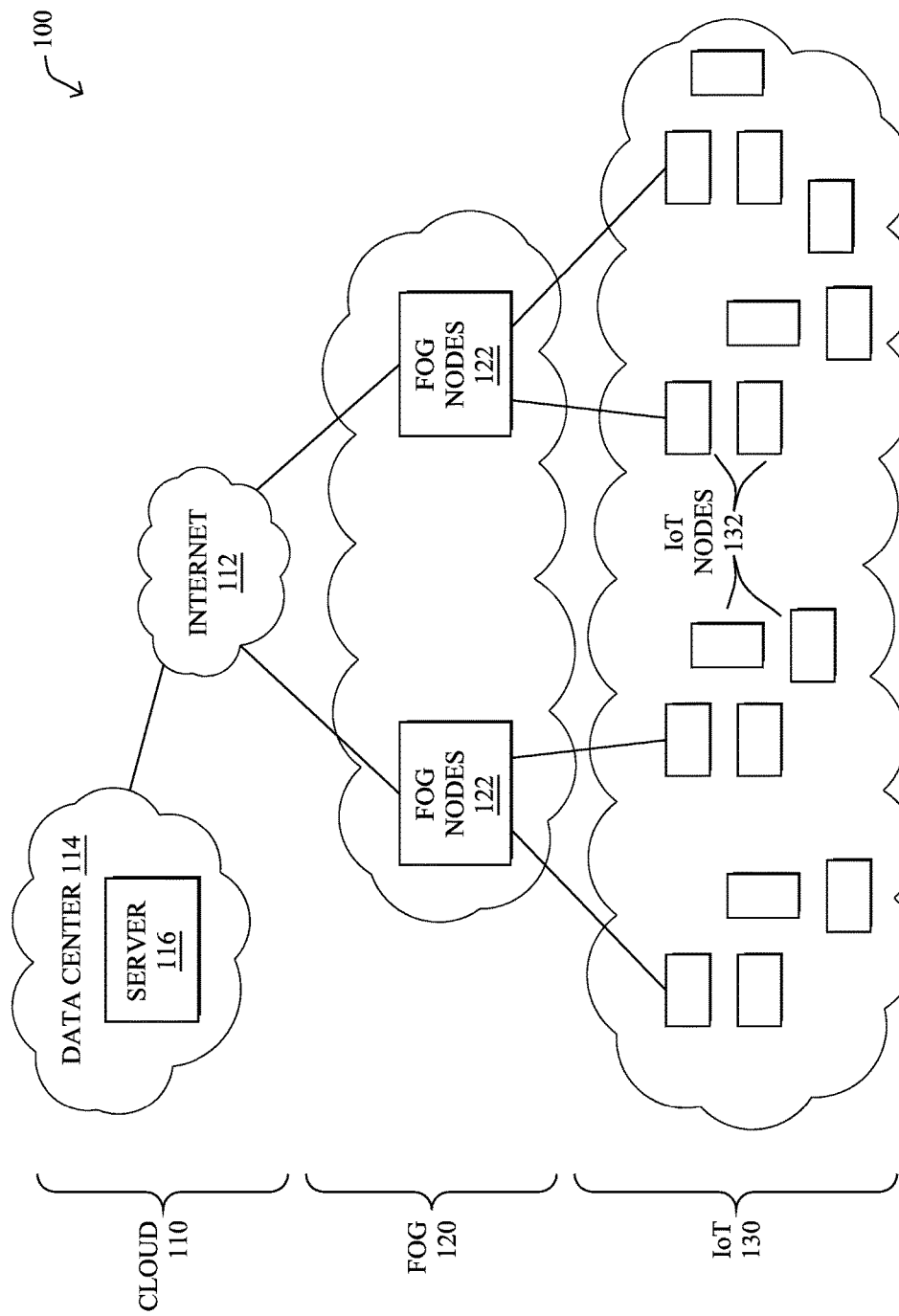
FIGS. 1A-1B illustrate an example communication network.

According to one or more embodiments of the disclosure, a device in a network receives vehicle characteristic data regarding one or more autonomous vehicles. Each of the one or more autonomous vehicles is equipped with a vehicle-based charging coil configured to receive electrical power from a ground-based charging coil of a wireless power transfer (WPT) system. The device, based on the received vehicle characteristic data, identifies one or more ground-based charging coils of the WPT system available to provide power to the one or more autonomous vehicles. The device determines driving parameters for the one or more vehicles to optimize power transfer from the one or more ground-based charging coils to the one or more vehicles. The device sends the driving parameters to the one or more vehicles to control movement of the one or more vehicles.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
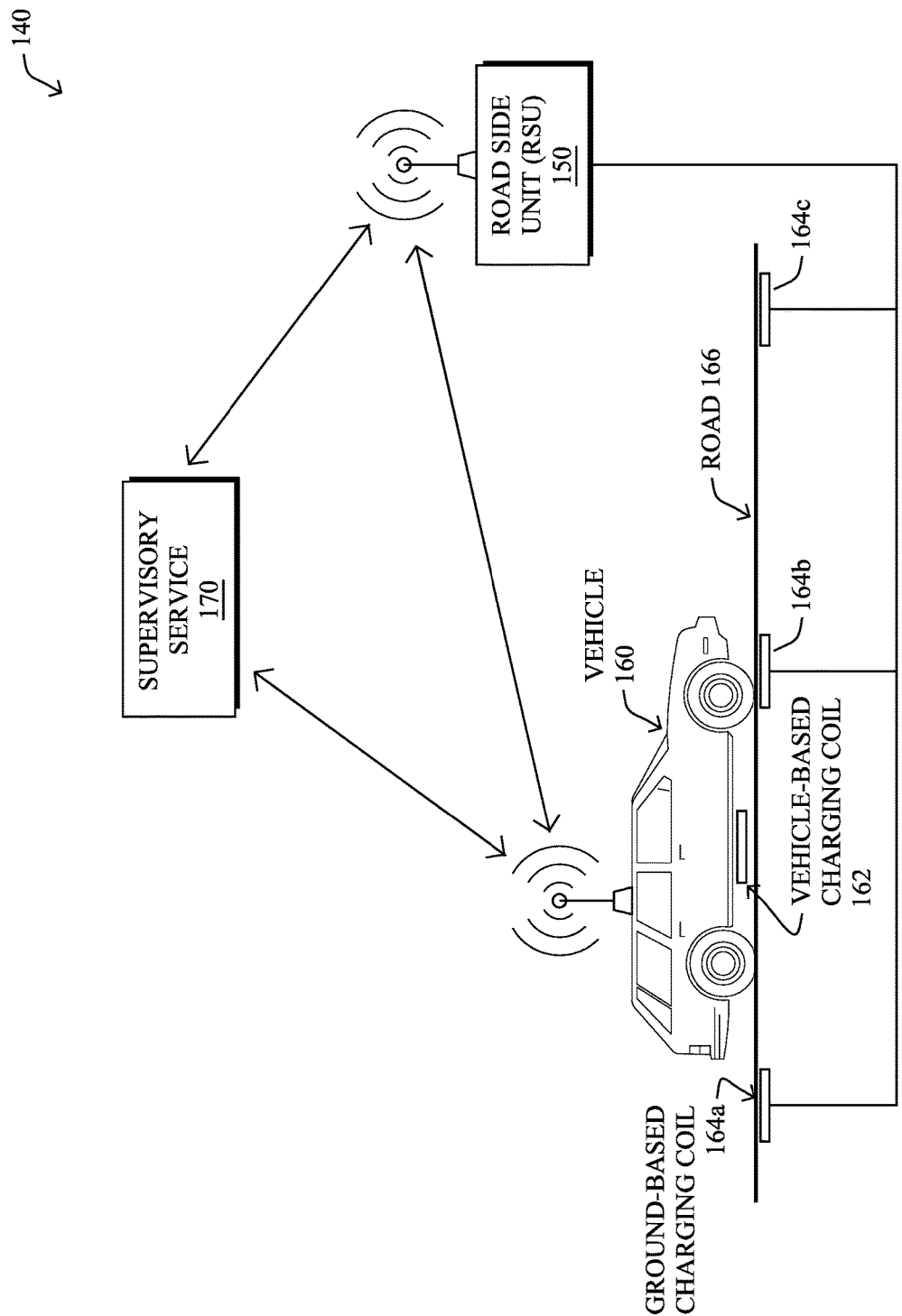

FIG. 1B illustrates an example wireless power transfer (WPT) system 140, according to various embodiments. In particular, WPT system 140 may include any or all of the following components: a vehicle 160, a roadside unit (RSU) 150, one or more ground-based charging coils 164, and/or a remote supervisory service 170. During operation, WPT system 140 may be operable to provide electrical charge to a local battery of vehicle 160, which may itself be an electric vehicle (e.g., either a fully-electric or hybrid electric vehicle).

In some embodiments, WPT system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. In further cases, supervisory service 170 may be implemented at fog computing layer 120, in further embodiments. Similarly, RSU 150 may be a fog node 122 at fog computing layer 120, while vehicle 160 may be viewed as an IoT node 132 at IoT layer 130. Thus, vehicle 160 may communicate directly with RSU 150, and/or via other IoT nodes 132 (e.g., other vehicles, etc.), and RSU 150 may provide some degree of processing over the communicated data.

RSU 150 may communicate with supervisory service 170 via a WAN, such as the Internet 112 or another WAN. For example, RSU 150 may communicate with supervisory service 170 by leveraging a hardwired network connection, cellular or other wireless connection, satellite connection, or the like. Communications between vehicle 160 and RSU 150 may generally be wireless and use any form of known wireless communication (e.g., Wi-Fi, cellular, light-based, etc.).

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, and the like. A local gateway of vehicle 160 may provide communicative connectivity between the local network of vehicle 160 and other devices. For example, the local gateway of vehicle 160 may provide wireless connectivity to RCU 150 located along road 166 on which vehicle 160 is traveling. In some embodiments, vehicle 160 may also communicate directly with supervisory service 170 via the Internet 112 or another WAN, such as by leveraging a wireless connection to a cellular or satellite-based network.

In various embodiments, vehicle 160 may comprise one or more vehicle-based charging coils 162 that are electronically coupled to the battery of vehicle 160. In addition, as shown, any number of ground-based charging coils 164 may be located along road 166, such as embedded into road 166. For example, ground-based charging coils 164a-164c may be embedded into road 166 and wired to RSU 150 that provides control over the powering of ground-based charging coils 164. For purposes of clarification, the term "ground-based charging coil" generally refers to the location of the charging coil (e.g., embedded into the ground) and is not intended to imply that a coil 164 acts an electrical ground. Also note that a ground-based coil is also sometimes referred to as a "primary coil" or "grid side coil."

During operation, ground-based charging coils 164 may be powered/energized, to charge the battery of vehicle 160. Notably, when vehicle-based charging coil 162 is located within proximity of a given ground-based charging coil 164, the powered coil 164 may inductively couple with vehicle-based charging coil 162. As a result, a current will be induced in vehicle-based charging coil 164, which can be used to restore charge to the battery of vehicle 160. Such charging may be performed when vehicle 160 is stationary or in motion, depending on the implementation. In addition, while ground-based charging coils 164 are shown as embedded into road 166 (or placed thereon), other implementations provide for coils 164 to be embedded into a parking lot, drive-thru, driveway, or any other location at which vehicle 160 may be located.

Figure 2:
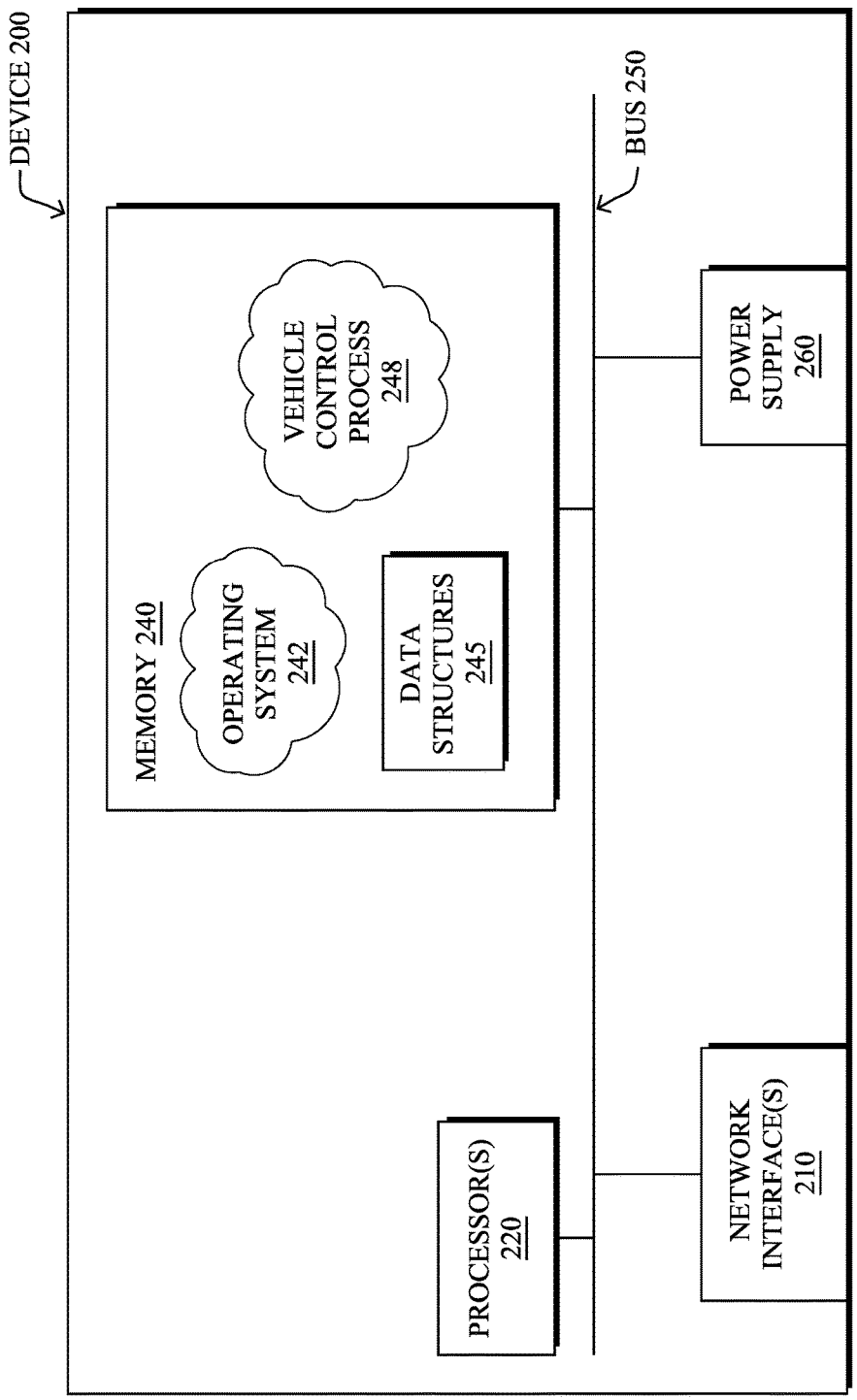
FIG. 2 illustrates an example network device/node.

FIG. 2 is a schematic block diagram of an example computing device/node 200 that may be used with one or more embodiments described herein e.g., as any of the devices shown in FIGS. 1A-1B above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative vehicle control process 248, as described herein.

In general, vehicle control process 248 may be configured to determine the optimal movement of a vehicle with respect to a wireless power transfer (WPT)-based vehicle charging system. In some embodiments, vehicle control process 248 may do so by leveraging machine learning, to learn and adapt to the various characteristics of the vehicle and/or the ground-based charging coils. In general, machine learning is concerned with the design and the development of techniques that take as input empirical data (such as position and movement information for the vehicle, the powering capabilities of the road-based coils, etc.), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, coil control process 248 may employ one or more supervised, unsupervised, or semi-supervised machine learning models. Generally, supervised learning entails the use of a training set of data, as noted above, that is used to train the model to apply labels to the input data. For example, the training data may include test results for different coil gaps and their associated amounts of charge conveyed to the vehicle. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that coil control process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, WPT is an emerging technology that has proven to be effective for charging electric vehicles (EVs). In a typical WPT setup for EVs, a ground-based coil is supplied power, thereby inducing a current remotely in a second, vehicle-based coil located at the bottom of the EV.

In a dynamic WPT scenario, a moving EV can travel over the ground-based coils where energy is transferred to the cars as they pass over the coils. To improve energy efficiency and/or keep the level of electromagnetic radiation low, some implementations may (only) energize the ground-based coils when the EV is on top of the coils. Note that superconducting coils could also be used, thereby lowering the energy loss, but these types of coils are unlikely to be used in typical implementations. In addition, regulating when the coils are energized could prevent heating issues, which could otherwise damage the infrastructure and lead to reliability issues.

FIGS. 3A-3D illustrate an example of powering a ground-based charging coil for an upcoming vehicle, according to various embodiments. Continuing the example of FIG. 1B, assume in FIG. 3A that vehicle 160 is in communication with supervisory service 170 and/or RSU 150 that are part of a vehicle WPT system. During operation, vehicle 160 may send data regarding the vehicle characteristics to service 170 and/or RSU 150 for further processing. Example vehicle characteristics 302 may include, but are not limited to, any or all of the following:

- A location of vehicle 160—for example, this information can include a Global Positioning System (GPS) coordinate from vehicle 160, navigation information from a subsystem of vehicle 160, a signal that can be used to triangulate the location of vehicle 160, etc.
- A velocity of vehicle 160—this information can be used to determine whether vehicle 160 is stationary or in motion, as well as timing information, to determine when the charging coils of vehicle 160 are expected to be in close proximity to a particular one of the ground-based charging coils 164. If this information is not provided, it can be derived based on changes in the location of vehicle 160 over time.
- Acceleration information for vehicle 160—in some cases, vehicle 160 may also provide acceleration information as part of vehicle characteristics 302, such as from its accelerometer. If this information is not provided, it can be derived based on changes in the velocity of vehicle 160 over time.
- Make, model, and/or options of vehicle 160—this information can be used to determine the specific charging capabilities of vehicle 160 from the factory. For example, a certain manufacturer may offer upgraded charging systems on certain models over others (e.g., a larger capacity battery, a larger charging coil, etc.).
- Coil information for vehicle 160—this information may include data regarding the physical dimensions of vehicle-based charging coil 162 and/or the location of coil 162 on vehicle 160. For example, this information may indicate the size and/or shape of coil 162 (e.g., length and width measurements, if coil 162 is rectangular, a radius measurement, if coil 162 is circular, etc.). In another example, the coil information regarding coil 162 may indicate the distance between coil 162 and one or more sides of vehicle 160 (e.g., coil 162 may be ⅔ of the way from the front of vehicle 160, x-number of feet or inches from the passenger or driver's side of vehicle 160, etc.). This information can be used to indicate whether coil 162 is perfectly centered on vehicle 160 or, if not, its offsets from the center. In a further example, the information regarding coil 162 can also indicate the height of coil 162 relative to the ground (e.g., a height of M1 inches when vehicle 160 is not moving, a height of M2 inches when vehicle 160 is traveling at slow speeds, a height of M3 inches when vehicle 160 is traveling at highway speeds, etc.). In various embodiments, the coil information for vehicle 160 can also be retrieved (e.g., by service 170), based on the make, model, and/or options of vehicle 160.
- Age of vehicle 160—As noted above, battery life and charging capabilities of a vehicle can change over time. This information can be used to predict how much of a change is expected from that of the factory configuration. For example, this information may comprise the year in which vehicle 160 was made.
- Battery specifications of vehicle 160—if the battery cannot be identified, such as when the make/model of vehicle 160 is not available, vehicle 160 can nonetheless provide the specifications of its battery as part of vehicle characteristics 302, in some cases.
- Maintenance history of vehicle 160—For example, if the battery of vehicle 160 was replaced at some point in time, this information can be pertinent to determining the appropriate charging parameters for vehicle 160.
- Battery management system (BMS) data from vehicle 160—this data can include any information regarding the current and/or prior states of the battery of vehicle 160. For example, the BMS data may be indicative of the existing charge in the battery of vehicle 160, a history of charging of the battery of vehicle 160, the current battery temperature and/or surrounding temperature, or the like.
- Authentication information from vehicle 160—in the case where WPT charging is restricted, provided on a controlled basis (e.g., only to residents, only on a paid basis, etc.), or the like, this information can also be included in vehicle characteristics 302.
- Surrounding information regarding vehicle 160—further information regarding the surroundings of vehicle 160 may include, for example, information regarding other vehicles within proximity of vehicle 160. Such information may be obtained, for example, by cameras, LIDAR, radar, or other sensors that may be located on vehicle 160 or along road 166.

As would be appreciated, any or all of the above vehicle characteristics 302 may be determined by vehicle 160 or, alternatively, by RSU 150 (e.g., based on sensor data from sensors of RSU 150, etc.).

Figure 3A:
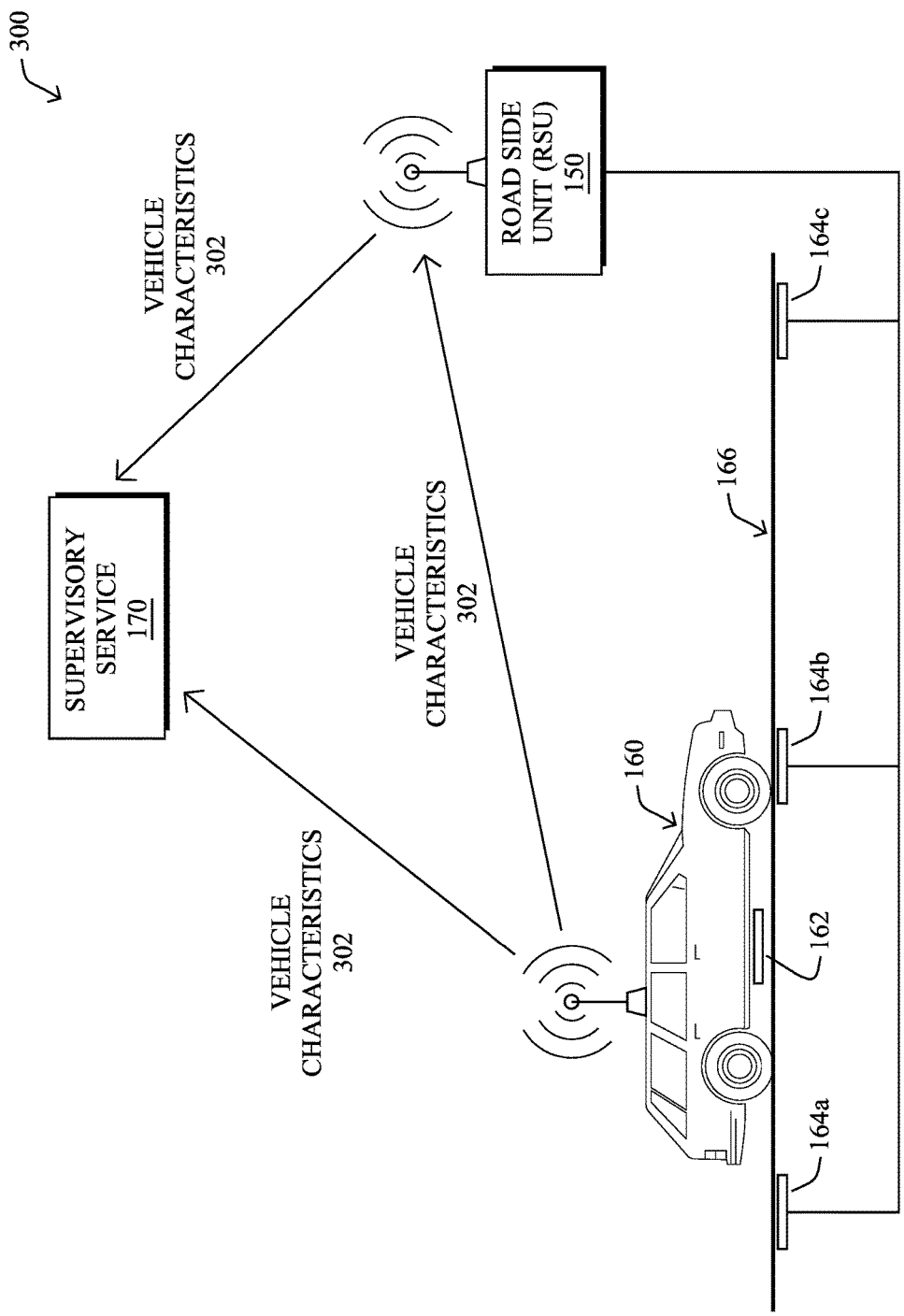
FIGS. 3A-3D illustrate an example of powering a ground-based charging coil for an upcoming vehicle in a WPT system.
Figure 3B:
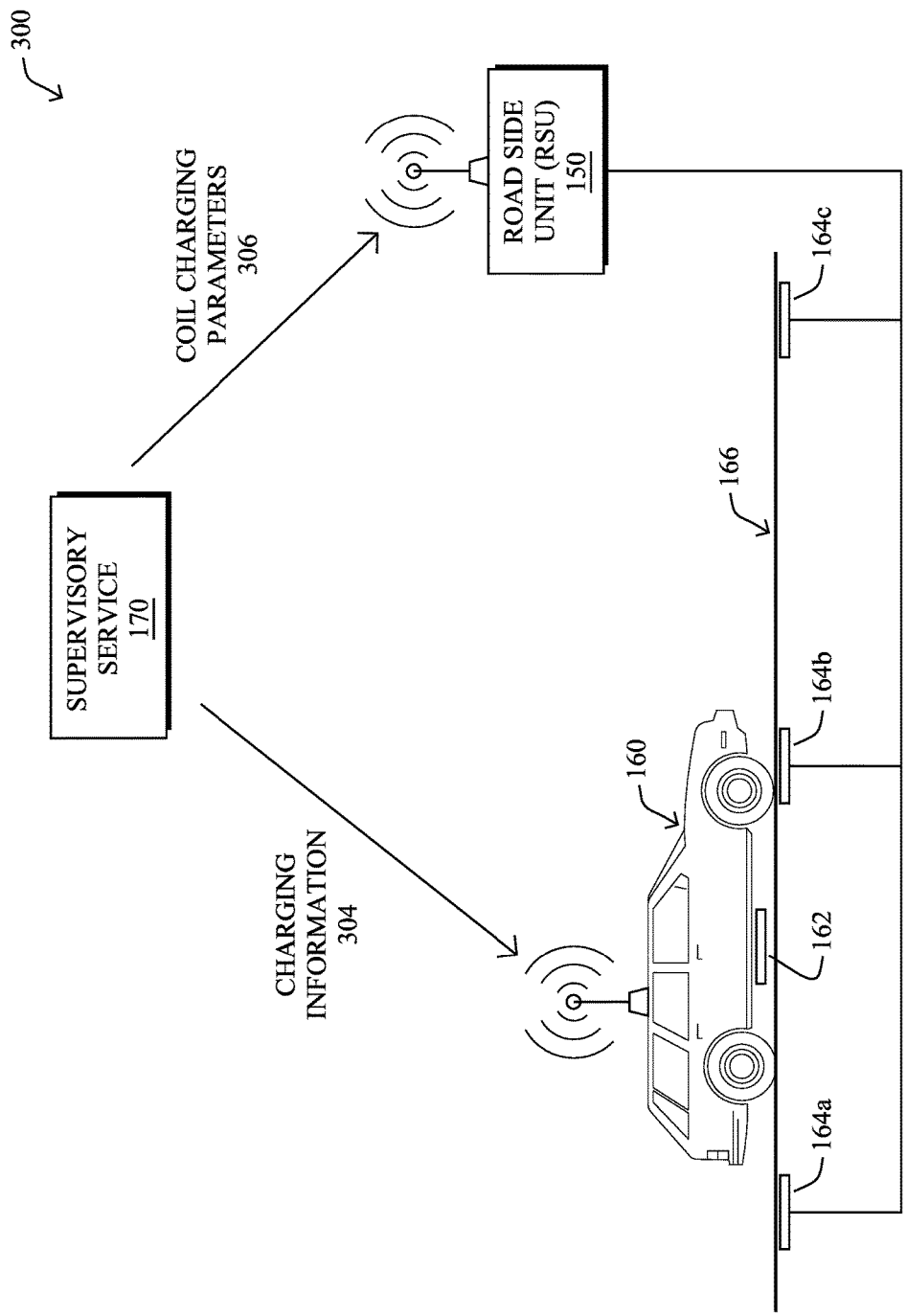

In FIG. 3B, supervisory service 170 may use the received vehicle characteristics 302, to determine the appropriate coil charging parameters 306 for ground-based charging coils 164. Generally, coil charging parameters 306 may indicate which of ground-based charging coils 164 are to be powered, if any, when coils 164 should be powered, and the appropriate power level to be supplied. For example, based on the vehicle characteristics 302, supervisory service 170 may determine that the charging coil 162 of vehicle 160 will be in close proximity (e.g., less than several feet) with that of ground-based charging coil 164b at a time $t=t_1$. In addition, supervisory service 170 may determine that vehicle 160 requires charging, is authorized to charge, and/or an amount of power that should be delivered to the identified ground-based charging coil 164b. Note that in further embodiments, any or all of these determinations may be made at the fog layer, such as by RSU 150.

In case of dynamic WPT, supervisory service 170 may also communicate charging information 304 back to vehicle 160 regarding the charging process. For example, charging information 304 may include driving parameters while vehicle 160 is in motion (e.g., directing vehicle 160 to maintain a certain speed, stay in the current lane, etc.), confirmations or notifications regarding the charging, or the like.

In some embodiments, charging information 304 may include alignment information that can be used by vehicle 160 to ensure that vehicle-based charging coil 162 is properly aligned with ground-based charging coil 164, when vehicle 160 passes over coil 164. For example, charging information 304 may indicate to vehicle 160 the lane in which coil 164 is situated and potentially the proper position for vehicle 160 within that lane. In addition, service 170 may also determine the optimal lane position for vehicle 160 and include this in charging information 304, so as to maximize the transfer of power during charging by ground-based charging coil 164 (e.g., such that the overlap of coils 162 and 164 is maximized).

In situations when ground-based charging coil 164 is in the center of the lane and vehicle-based charging coil 162 is located at the center of vehicle 160 (e.g., in terms of side-to-side dimensions), then coil alignment is relatively easy and vehicle 160 simply needs to drive down the center of the lane. However, in many cases, ground-based charging coil 164 may be offset from the center of the lane (e.g., six inches to the right of lane center, etc.) or vehicle-based charging coil 162 may not be located centrally on vehicle 160 (e.g., four inches left of vehicle center, etc.). In such cases, including alignment information in charging information 304 allows vehicle 160 to be directed towards the proper lane and alignment, for maximum charging. For example, charging information 304 may indicate that vehicle 160 should drive ten inches to the right of lane center, to maximize the overlap, if coil 164 is six inches to the right of the center of the lane and coil 162 is four inches to the left of the center of vehicle 160. This relatively small change of ten inches may lead to a significant increase in the percentage of overlap between coils 162 and 164 and, therefore, the power transfer.

Implementation of the recommended lane and alignment can be achieved either autonomously, if vehicle 160 is so capable, or via feedback to the driver. For example, vehicle 160 may be equipped to translate charging information 304 into alerts for the driver of vehicle 160, such as voice alerts, video alerts (e.g., on a dash-based display), or even augmented reality alerts via a windshield-based display, to direct the driver to move vehicle 160 to a specific lane and/or how to position vehicle 160 within the lane.

Figure 3C:
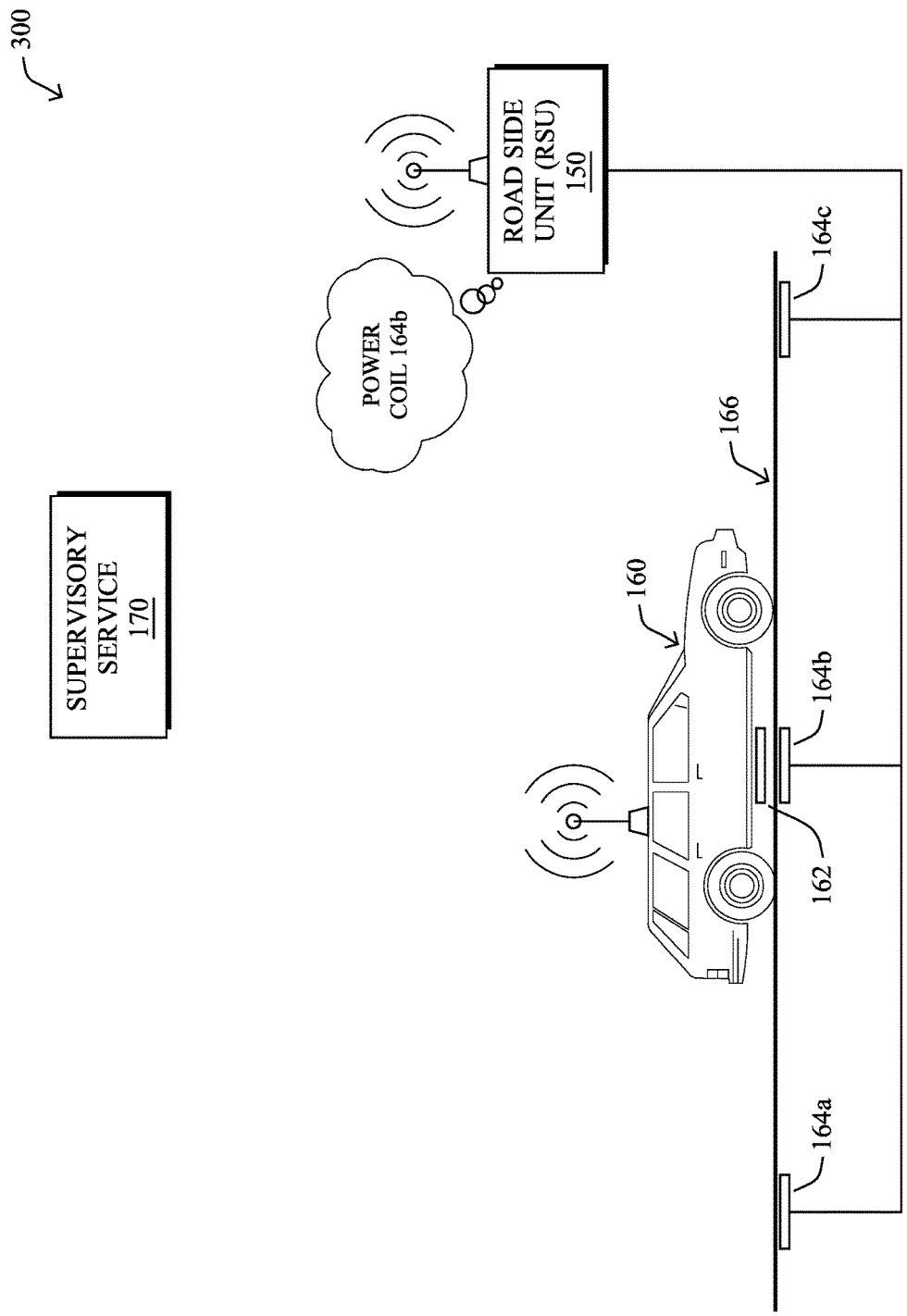

In FIG. 3C, RSU 150 may provide power to ground-based charging coil 164b, based on coil charging parameters 306. For example, RSU 150 may cause ground-based charging coil 164b to be powered to a certain power level, in advance of vehicle 160 arriving at ground-based charging coil 164b. Thus, when vehicle-based charging coil 162 is within charging proximity of ground-based charging coil 164b, the two coils may inductively couple with one another, thereby transferring power to vehicle 160 that can be used to charge the battery of vehicle 160.

Figure 3D:
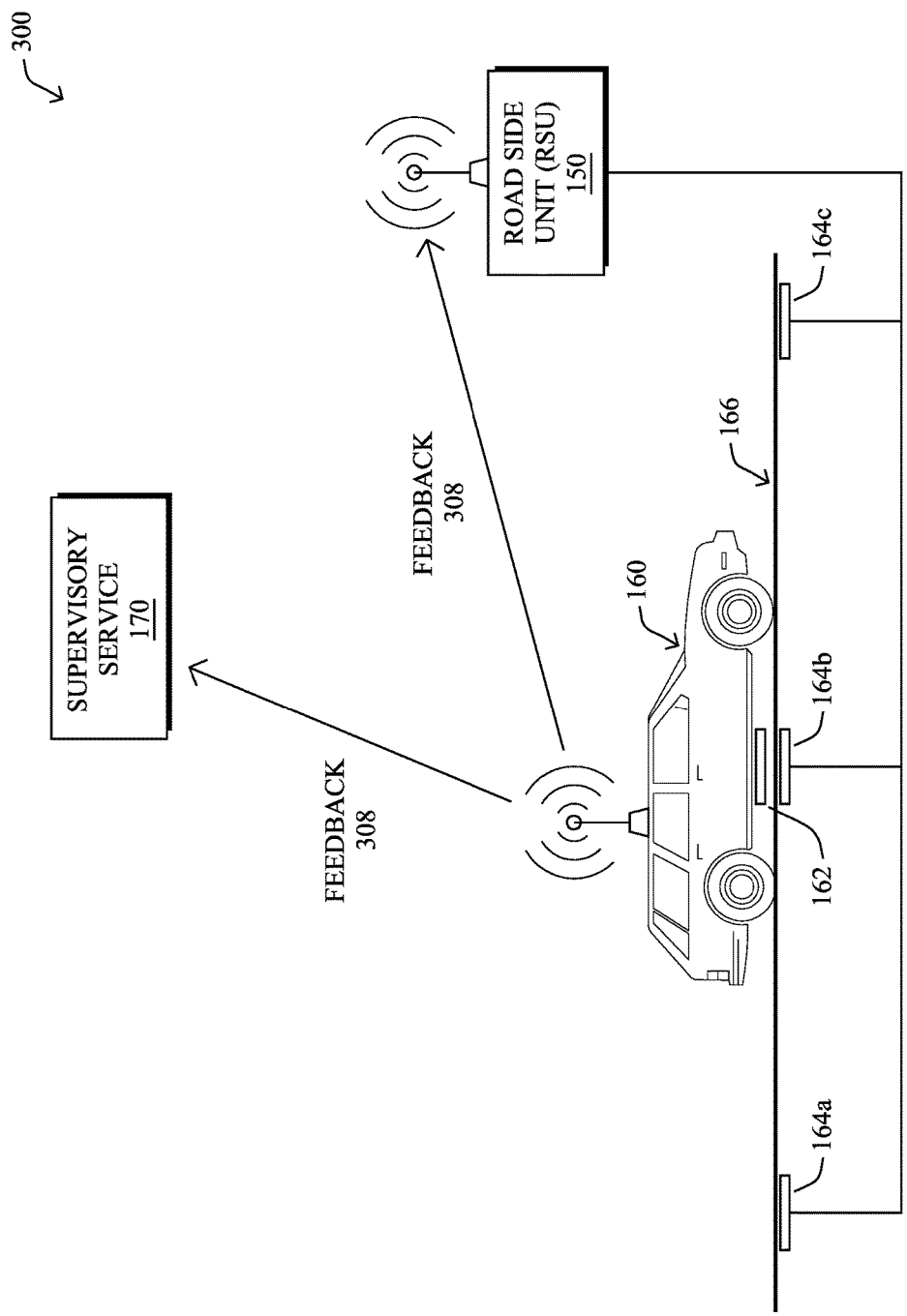

In FIG. 3D, vehicle 160 may also provide feedback 308 to supervisory service 170, and/or to RSU 150, regarding the charging from ground-based charging coil 164b. For example, feedback 308 may be indicative of the amount of charge that vehicle 160 was able to obtain from ground-based charging coil 164b, timing information in terms of the power transfer, or any other information regarding the charging operation. Such feedback can be used, in some embodiments, to update a machine learning model that seeks to optimize the power transfer process.

Since, in each such transfer, the amount of power delivered is several thousand kilowatts, (20 KW and even 100 KW & higher in future), the charging system comprising ground-based charging coils 164, tuned circuit, the AC-DC converter, and other associated components may need some time to recover and be ready to deliver another power transfer. Furthermore, the amount of energy delivered is also a function of the time that the current vehicle is over the charging coils (note that energy=integral of power over time), so optimizing the combination of power transfer and time for the transfer leads to the largest energy transferred to the vehicle.

More specifically, the time for a given ground-based charging coil 164 to recover is a function of several parameters, such as:

Available energy from the grid.

The amount of energy being transferred for given set of vehicles, which may vary by model, manufacturer, type of charging etc., as some vehicles may take less energy in each transfer vs. some may take more.

Environmental parameters such as ambient temperature. For example, at higher ambient temperatures, one may want to run the WPT system at a reduced duty cycle, to keep switching losses and heat dissipation in system components at a lower level than possible when running at colder temperatures.

In addition, from the perspective of the charging vehicle, several factors control the amount of energy that the vehicle receives during its travel. These factors include:

The speed of the vehicle, whereby the longer the amount of time the vehicle is positioned over the coil, the larger the power transfer.

The amount of energy each ground-based coil can deliver. This, in turn, depends on the power infrastructure supporting the coils.

How much energy is available in the ground-based charging coil plus its local energy storage (e.g., the amount of energy left in the coil after power transfer to a vehicle, etc.). This may be lower than the maximum or nominal for the coil if, for example, many vehicles have just been charged and therefore the local energy storage is largely depleted.

Thus, there are many potential inefficiencies in a vehicle WPT system that can arise from the way and manner in which traffic traverses the ground-based charging coils of the system. In various embodiments, power transfer in such a system can be optimized by providing some degree of control over the vehicles passing through the WPT system. Notably, in various embodiments, autonomous or semi-autonomous vehicles can be controlled to optimize their charging by the WPT system. Even in the case of mixed traffic, such as charging and non-charging or non-autonomous vehicles, this control can help to optimize the power transfer.

—Intelligent Vehicle Control for Wireless Power Transfer (WPT)—

In certain aspects, the techniques herein allow for vehicle traffic to be controlled intelligently in a dynamic WPT system. In various aspects, the techniques allow for the speed, spacing, and/or vehicle routes to be controlled. The proposed techniques also support vehicle traffic involving non-electric vehicles, non-autonomous vehicles, and/or non-charging electric vehicles. In further aspects, the techniques herein may leverage machine learning to adapt the power transfer optimization over time.

Illustratively, the techniques described herein may be performed by hardware, software, and/or firmware, such as in accordance with the illustrative vehicle control process 248, which may include computer executable instructions executed by the processor 220 (or independent processor of interfaces 210) to perform functions relating to the techniques described herein.

Specifically, according to various embodiments, a device in a network receives vehicle characteristic data regarding one or more autonomous vehicles. Each of the one or more autonomous vehicles is equipped with a vehicle-based charging coil configured to receive electrical power from a ground-based charging coil of a wireless power transfer (WPT) system. The device, based on the received vehicle characteristic data, identifies one or more ground-based charging coils of the WPT system available to provide power to the one or more autonomous vehicles. The device determines driving parameters for the one or more vehicles to optimize power transfer from the one or more ground-based charging coils to the one or more vehicles. The device sends the driving parameters to the one or more vehicles to control movement of the one or more vehicles.

Operationally, the techniques introduced herein allow for the control of vehicle traffic over roadways that are equipped with WPT charging coils in an intelligent manner. Such control includes controlling the vehicle traffic in terms of vehicle speeds, inter-vehicle spacing, lane selection, and/or route selection. These techniques can also be applied to various situations such as which only a portion of the vehicle traffic is autonomous, a portion of the vehicle traffic comprises non-charging vehicles (e.g., vehicles not equipped with charging coils, vehicles that do not require charging at this time, etc.).

Figure 4:
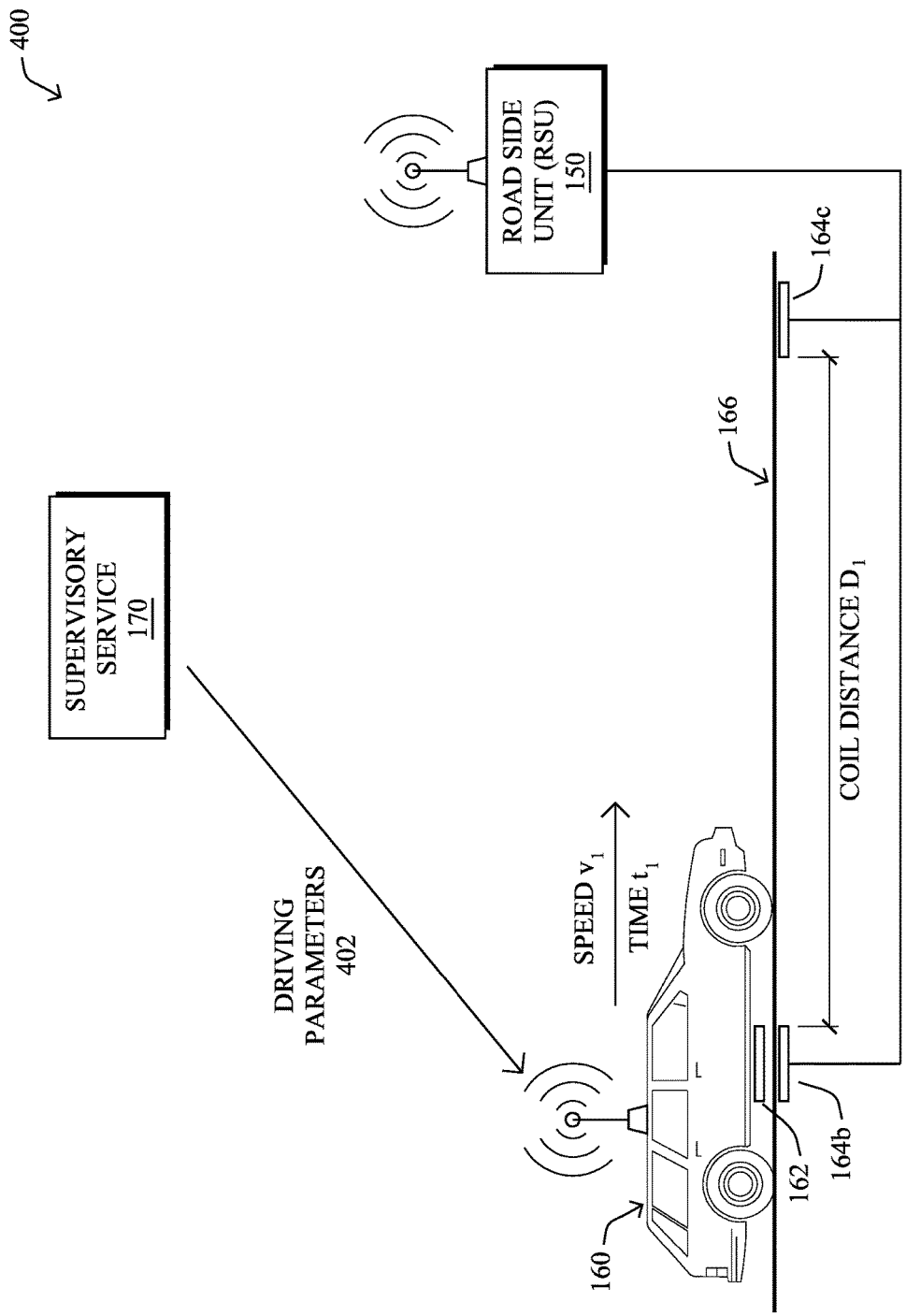
FIG. 4 illustrates an example of vehicle speed control with respect to a WPT system.

Speed Control:

FIG. 4 illustrates an example of vehicle speed control with respect to a WPT system, according to various embodiments. As shown, assume that vehicle 160 is currently receiving charge from ground-based charging coil 164b at time $T=t_1$. Further, assume that vehicle 160 is traveling at a speed $v_1$ towards the next ground-based charging coil 164c. In some cases, ground-based charging coil 164c may be permanently energized. However, doing so would clearly waste energy over the course of time. A better approach would be to energize ground-based charging coil 164c only as needed, such as when vehicle 160 is approaching and requires charging.

To optimize the power transfer to vehicle 160 and reduce wasted energy by only energizing ground-based charging coil 164c on demand, a minimum amount of time is needed to power up ground-based charging coil 164c in advance of vehicle 160. This amount of time (t) is a function of the coil distance $D_1$ between ground-based charging coils 164b and 164c, as well as the speed of vehicle 160, $v_1$. Accordingly, in various embodiments, supervisory service 170 and/or RSU 150 may determine whether the current speed of vehicle 160 is sufficient to allow coil 164c enough time to energize and, if not, may determine an appropriate speed for vehicle 160 that does so. In turn, supervisory service 170 or RSU 150 may send this determined speed to vehicle 160 as part of driving parameters 402. In the case of vehicle 160 being an autonomous or semi-autonomous vehicle, vehicle 160 can then use driving parameters 402 to regulate its speed automatically. Alternatively, if vehicle 160 is not an autonomous vehicle, driving parameters 402 can still be displayed to the driver of vehicle 160, thereby instructing the driver to adjust the speed of vehicle 160 to the optimal speed.

By way of illustration, the following steps may be taken, to regulate the speed of vehicle 160:

1. Vehicle 160 enters a domain that offers dynamic WPT, such as the physical domain/region that includes ground-based charging coils 164b and 164c. Note that it is presumed that vehicle 160 has already indicated its intent to receive WPT charging while driving in this domain and has been authorized to do so. Notably, based on characteristic data 302 sent to supervisory service 170, it is assumed for purposes of illustration in FIG. 4 that vehicle 160 has already authenticated itself to supervisory service 170, its billing information has already been established, if required, etc.
2. During initial negotiation with the road side infrastructure, the WPT system may determine the optimum amount of energy that can be delivered in each transfer, as well as the delay (t) needed for becoming fully ready at the next ground-based charging coil 164c, to deliver next chunk of energy.
3. It is also presumed that the roadside infrastructure already knows the distance $D_1$ between ground-based charging coils 164b and 164c. For example, RSU 150 can relay these pieces of information ($D_1$, t) to supervisory service 170. Alternatively, this information may be available as part of the design of the WPT system.
4. Based on the minimum delay needed by ground-based charging coil 164c, supervisory service 170 can compute the maximum speed that vehicle 160 can travel. As would be appreciated, this speed corresponds to the travel time needed for vehicle 160 to reach ground-based charging coil 164c (e.g., the faster vehicle 160 goes, the sooner it will reach coil 164c). In general, the goal of this computation is to provide sufficient time for coil 164c to be ready to charge vehicle 160, as well as for vehicle 160 to be ready to receive the is next charge.
5. Supervisory service 170 can communicate the determined speed to the autonomous driving software of vehicle 160 as part of driving parameters 402 either directly. Alternatively, this communication can happen through RSU 150 or via a separate communication path between supervisory service 160 and the autonomous driving software of vehicle 160.

Note that if the determined speed for vehicle 160 needed by ground-based charging coil 164c to properly charge is outside of a safe driving range (e.g., below a certain amount or percentage of the speed limit for road 166), the speed control over vehicle 160 and/or the charging by ground-based charging coil 164c can be bypassed.

Spacing Control:

As noted above, another factor that can affect whether a given ground-based charging coil has sufficient time to power up for an oncoming vehicle is the rate at which the coil services multiple vehicles. In particular, if the rate of vehicles passing over the coil is too high, the coil may not have enough time to properly re-energize for the next oncoming vehicle.

Besides speed, another aspect of the vehicle control techniques herein is controlling the separation between two or more vehicles such that, for consecutive series of coils served by shared power delivery infrastructure, the separation between vehicles should not cause the vehicles aligned over all coils simultaneously. For example, the system may control the speed and distance between the vehicles, which corresponds to the time between when consecutive vehicles would arrive at a ground-based charging coil, since distance/speed=time, so that the infrastructure will be prepared to give each vehicle the optimal charge possible. If the time-spacing between vehicles is too small, then the WPT system will not be able to sufficiently prepare to charge the consecutive vehicles and the charging (may) be less than optimal or desired. Conversely, if the time-spacing between vehicles is larger than required, then the vehicles may be going at a slower speed than required and therefore they may arrive at their desired destination later than optimal or desired.

Figure 5:
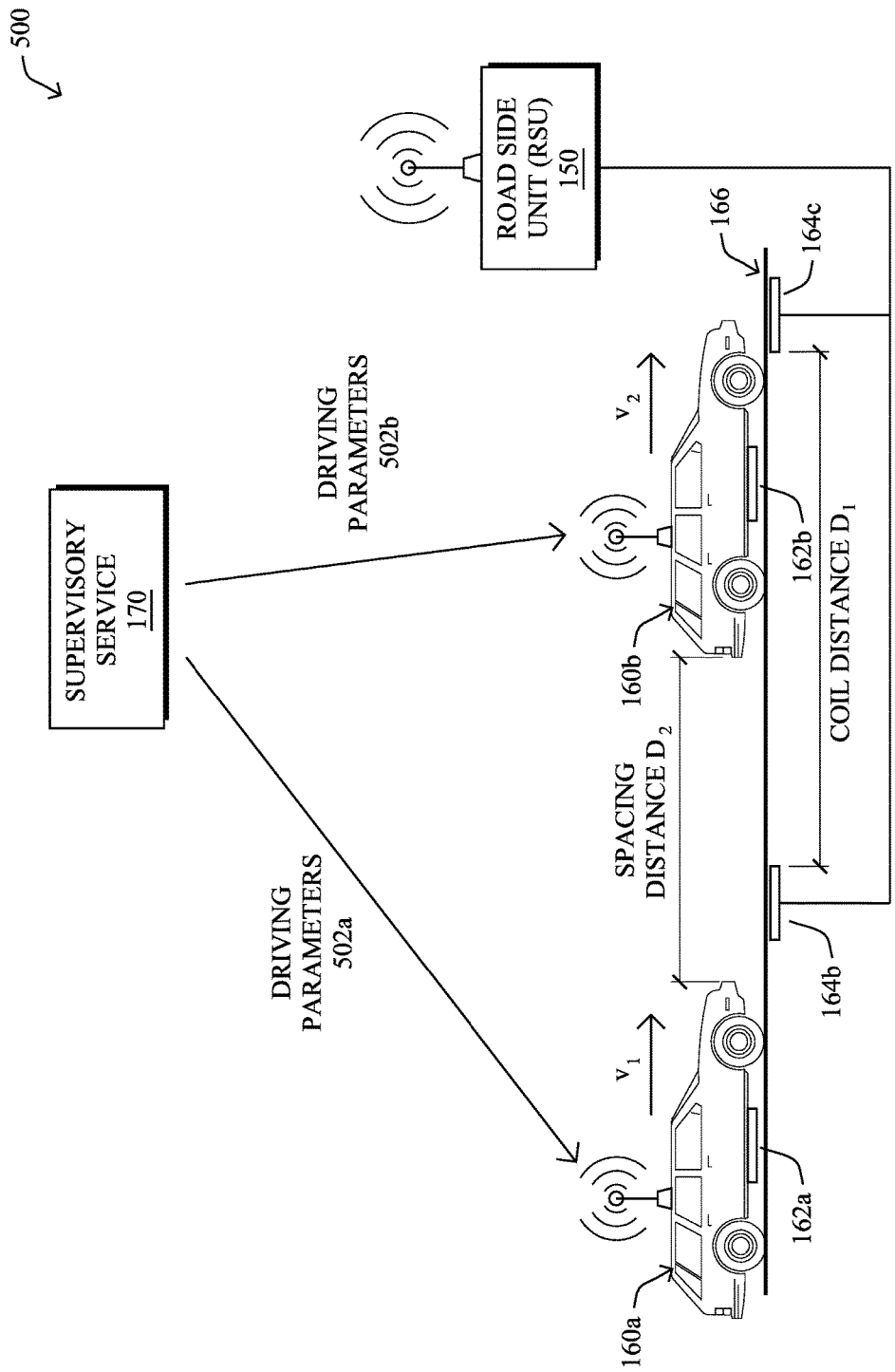
FIG. 5 illustrates an example of vehicle spacing control with respect to a WPT system.

FIG. 5 illustrates an example of vehicle spacing control with respect to a WPT system, according to various embodiments. For purposes of illustration, assume that both vehicles 160a and 160b are electric vehicles that are to undergo charging by the WPT system. Also, assume that vehicle 160a is traveling at speed/velocity $v_1$, that vehicle 160*b* is traveling at speed/velocity $v_2$. Further, vehicles 160*a* and 160*b* may be spaced apart by a distance $D_2$.

As noted above, the locations, velocities, and/or spacing distance $D_2$ may be included in the reported vehicle characteristic data 302 sent to supervisory service 170 and/or RSU 150. In various embodiments, this information can be used by supervisory service 170 and/or RSU 150 to determine an optimal spacing distance between vehicles 160*a* and 160*b*, as well as the appropriate velocities for the vehicles.

Notably, supervisory service 170 may determine the appropriate velocities and spacing distance between vehicles 160*a* and 160*b* that optimizes the power transfer by ground-based coil 164*c*. In turn, these parameters can be provided to vehicles 160*a* and 160*b* as part of driving parameters 502*a* and 502*b*, which can be implemented either automatically (e.g., if the vehicles are autonomous) or manually (e.g., by presenting them to the drivers). For example, supervisory service 170 may control the flow of traffic that includes vehicles 160*a*-160*b* according to an optimal duty cycle for ground-based charging coil 164*c*.

In further cases, the spacing between vehicles 160*a*-160*b*, their relative positions (e.g., which is the leading vehicle), which lanes that traverse, or the like, may be controlled in part based on their individual charging needs. For example, if vehicle 160*a* requires ground-based charging coil 164*c* to be powered to a lower level than that required by vehicle 160*b*, supervisory service 170 may control vehicle 160*b* to be the lead car, allowing ground-based charging coil 164*c* to recover more quickly.

While the use of only autonomous vehicles allows for full optimization of the power transfer process by the WPT system, this situation is highly unlikely to occur in the near future. More likely, the traffic along road 166 may be interspersed with autonomous vehicles, non-autonomous vehicles, charging vehicles that are to receive charge from the WPT system, and/or non-charging vehicles.

Figure 6:
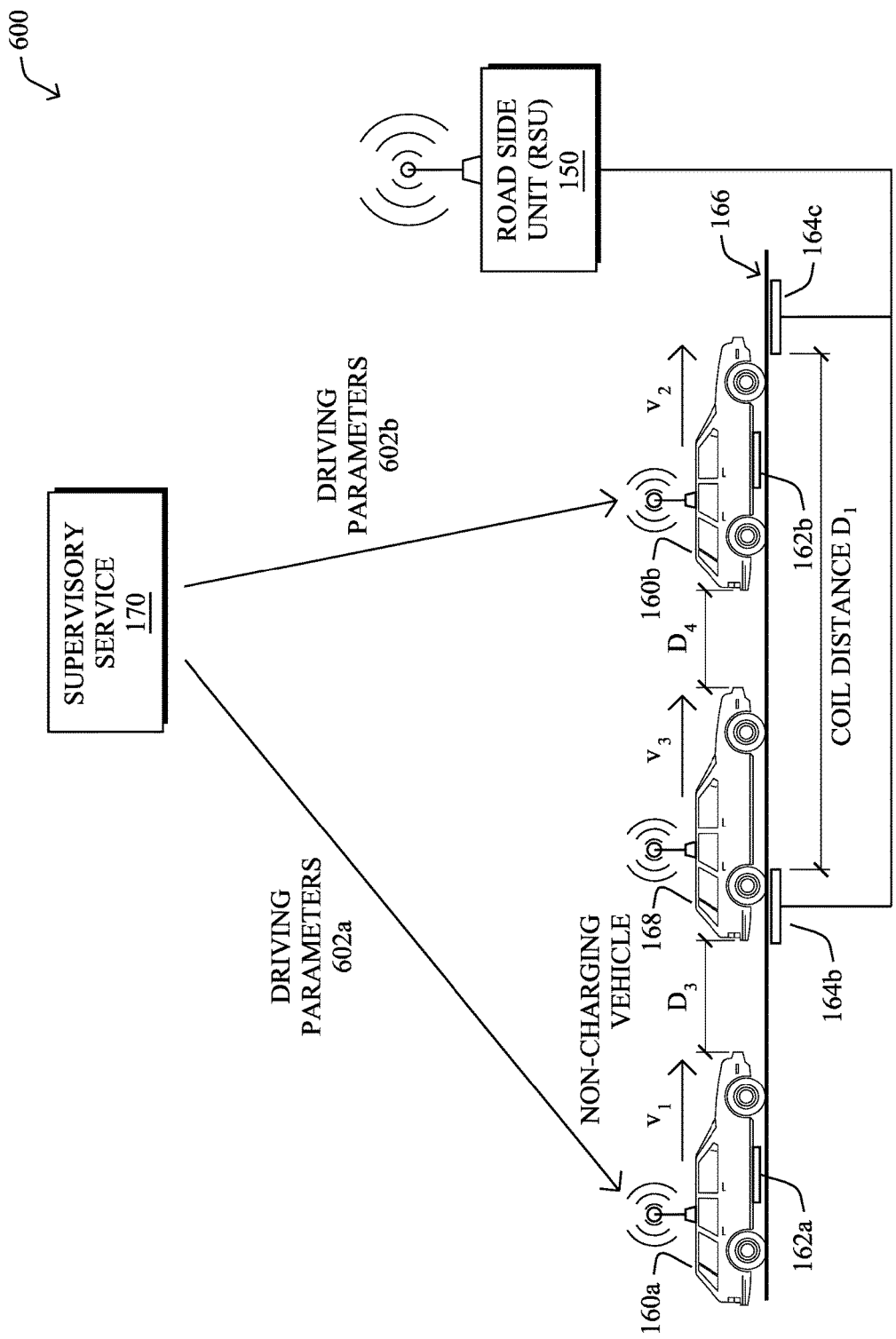
FIG. 6 illustrates an example of vehicle spacing control for both WPT and non-WPT vehicles with respect to a WPT system.

FIG. 6 illustrates an example of vehicle spacing control for both WPT and non-WPT vehicles with respect to a WPT system, according to various embodiments. As shown, consider the case in which vehicles 160*a* and 160*b* are traveling with another, non-charging vehicle 168. Similar to the example of FIG. 5, the WPT system may provide driving parameters 602*a* and 602*b* to control both the velocities of vehicles 160*a* and 160*b*, their spacing distances with non-charging vehicle 168 (e.g., distance $D_3$ between vehicles 160*a* and 168, distance $D_4$ between vehicles 160*b* and non-charging vehicles 168, etc.), as well as potentially the ordering of vehicles 160*a*-160*b* and 168, according to various embodiments. Notably, even in the case whereby vehicle 168 cannot receive driving parameters, supervisory service 170 and/or RSU 150 may provide the appropriate driving parameters 602*a*-602*b* to vehicles 160*a*-160*b* that optimize the power transfer to vehicles 160*a*-160*b* by ground-based charging coils 164*b*-164*c*.

For example, the WPT system may be able to maintain tighter spacing and higher overall traffic speed by interleaving charging vehicles (e.g., vehicles 160*a*-160*b*) with non-charging vehicles (e.g., vehicle 168) such that the duty cycle for the charging system is satisfied as desired, by maintaining an effective spacing gap and achieving a high traffic density.

Furthermore, when the infrastructure supports multiple lanes equipped with dynamic WPT capabilities (e.g., road 166 has multiple lanes with ground-based charging coils), the WPT system may also determine driving parameters 602*a*-602*b* to distribute the traffic across lanes. This will not only load balance the energy transfer across the charging infrastructure but it will also be able to achieve higher traffic density and speed.

Another variation of the spacing control, in further embodiments, is to form vehicle 'platoons,' based on the known charging needs of the traveling vehicles. For example, the battery management systems (BMSs) of the vehicle may require different recovery times. In such cases, the system can control the speed, spacing, and/or positions of the vehicles, to control the duty cycles of the ground-based charging coils, thereby optimizing the power transfer process.

Figure 7:
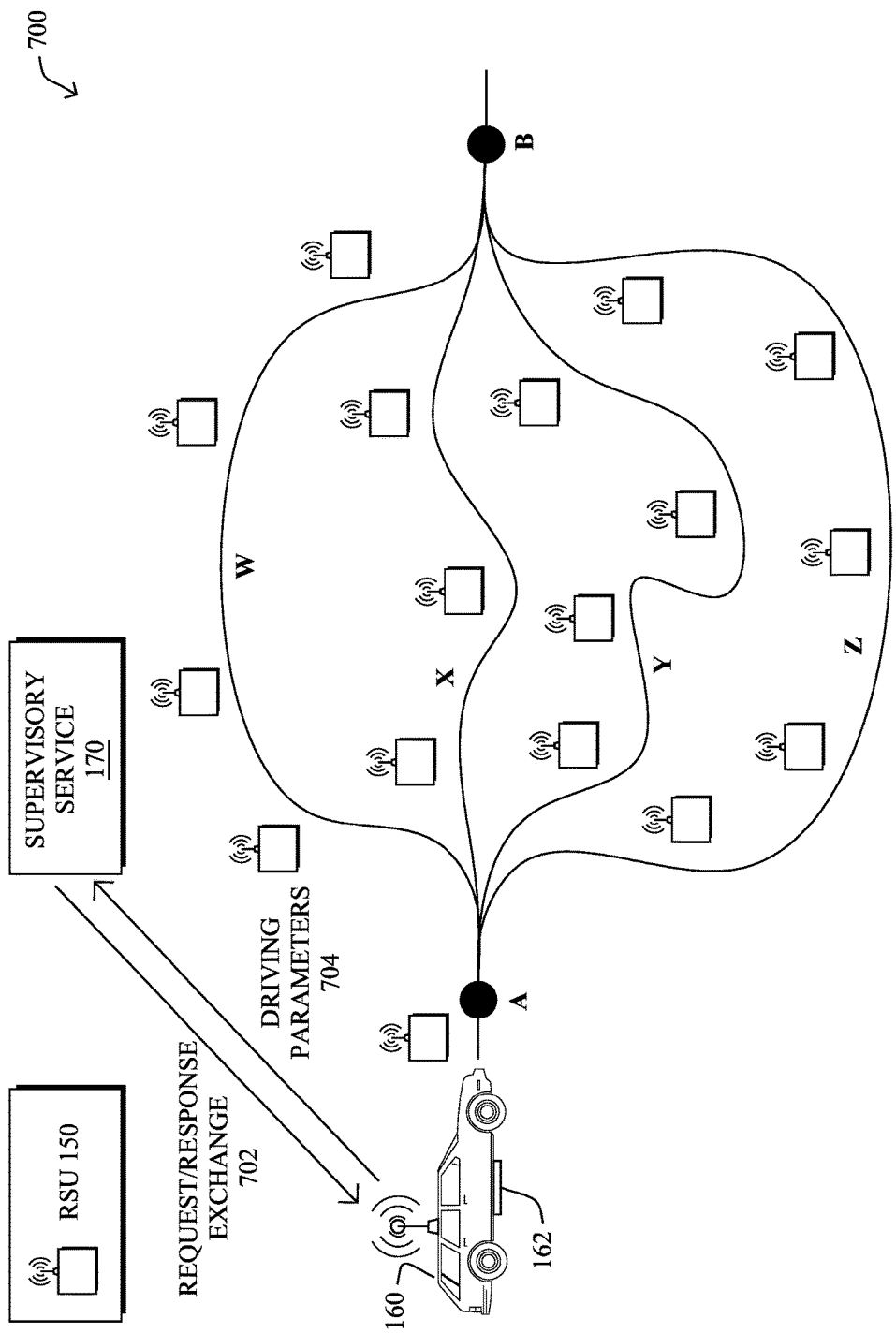
FIG. 7 illustrates an example of path selection with respect to a WPT system.

Route Control:

Beyond controlling the speed and/or spacing of the vehicles, the WPT system may be configured to control the routes and paths traveled by the vehicles. For example, as shown in FIG. 7, assume that there are four paths available between points A and B: paths W, X, Y and Z. In such a case, the WPT system may control vehicle 160 to take a path that optimizes the power transfer and potentially satisfies other constraints, as well (e.g., estimated arrival time at point B, cost, etc.).

As shown, vehicle 160 may initiate a request/response exchange 702, prior to approaching point A. Such an exchange may indicate to supervisory service 170 (or to an RSU 150) that vehicle 160 intends to travel from point A to point B. Such an intent may be identified based on information from a navigation system of vehicle 160, voice commands, or the like. In addition, vehicle 160 may also request N units of energy during this travel.

In some cases, supervisory service 170 may respond to vehicle 160 as part of exchange 702 with a number of options. For example, supervisory service 170 may provide options to vehicle 160 regarding the various costs associated with paths W, X, Y, and Z (e.g., in terms of travel time, etc.). These different costs could also result from different jurisdictions providing energy at different costs. Alternatively, it may also be a result of different energy resources providing energy. For example, there may be a renewable resource producing excess energy available along certain route that the energy provider would like to distribute at attractive prices at the present time.

If the requested amount of energy is unavailable along any of the paths, or if none of the paths can satisfy the constraints indicated by vehicle 160 as part of exchange 702, supervisory service 170 may indicate so in exchange 702 and vehicle 160 may be left to select a path on its own. However, in various embodiments, if one or more of paths W-Z satisfies the constraints (e.g., in terms of providing a requested amount of energy, distance/time, etc.), supervisory service 170 may send an indication of the available route(s) to vehicle 160. In turn, vehicle 160 may use the provided driving parameters 704 to select one of the routes that satisfies the constraints (e.g., by prompting the driver for input, using further information from the navigation system, such as traffic information, etc.). In one embodiment, vehicle 160 may also provide feedback regarding the selected route to service 170 that can be used by service 170 to prepare the WPT system. Alternatively, supervisory service 170 may make the selection and provide an instruction to vehicle 160 to take the selected route.

Similar to the route selection scenario the infrastructure can use the cost-based and/or resource-based model to manage the traffic in different lanes of the road. The idea here is that different lanes along a given road may have, for example:

a.) some lanes may have charging capability and some may not;

b.) the lanes that have charging capability may have different levels of charging support built into each lane (e.g., high-power charging and low-power charging);

c.) each lane may have different charging capabilities based on, e.g., the amount of charge they have (supply) at a point in time and the amount of requests from cars (demand) at that point in time.

Note that (a) and (b) are static attributes while (c) is time-varying.

This can be used, in some embodiments, to:

Load balance the traffic requiring charging across various lanes that may provide charging. In many cases, it would be desirable to spread out/load balance the traffic in space (across different lanes) and in time (e.g., multiple cars driving in the same lane but spaced apart so they do not arrive at a charging coil immediately after each other).

Create models whereby certain lanes can charge premiums for higher energy delivery.

Cars that desire charging could go in a slower lane where the lower speed facilitates larger energy transfer and at the same time as the car goes at this lower speed it does not delay/annoy other cars which desire to go at higher speeds.

Figure 8:
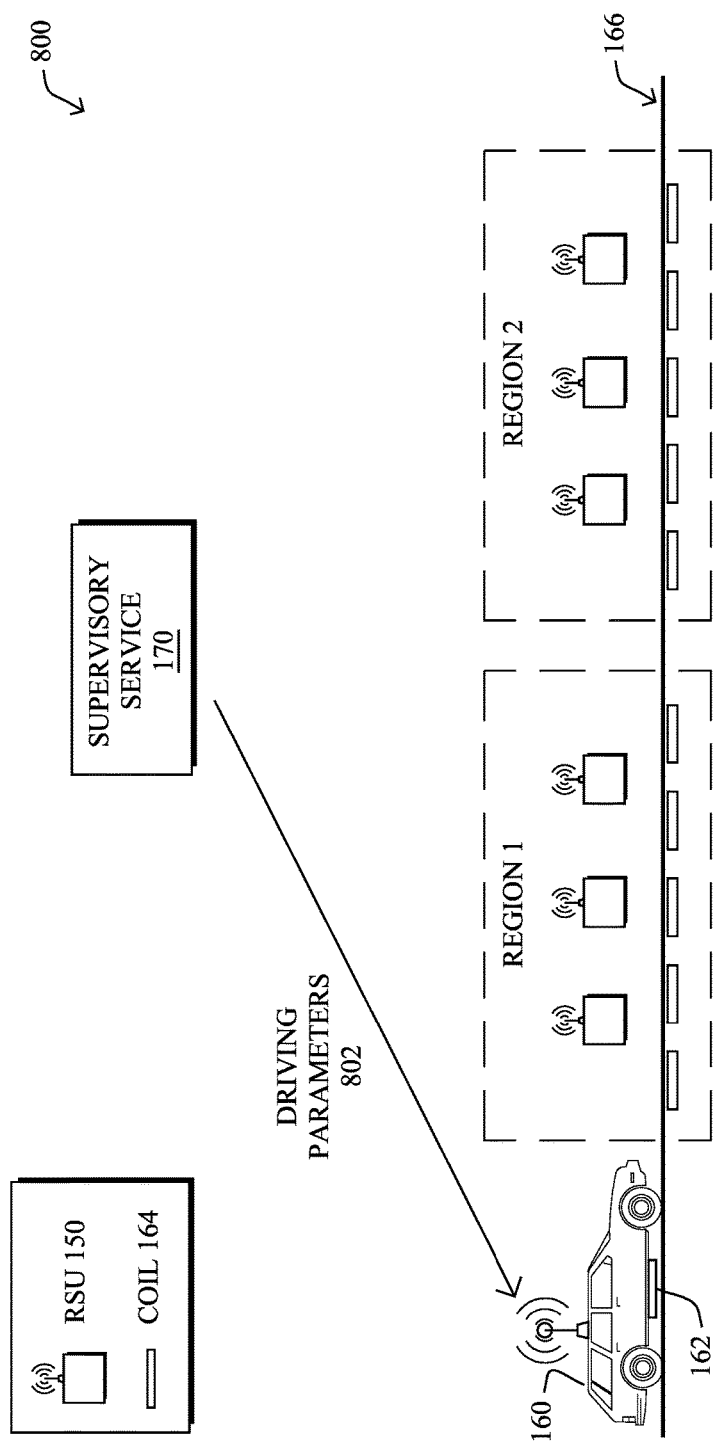
FIG. 8 illustrates an example of different WPT regions.

FIG. 8 illustrates an example of different WPT regions, according to various embodiments. In some cases, different WPT regions may offer different options that can be used for purposes of selecting ground-based charging coils 164 to be used to charge vehicle 160. For example, a first set of ground-based charging coils 164 may be located in a physical region 1, while a second set of ground-based charging coils 164 may be located in a physical region 2. Each of the two different sets of coils 164 may also have different associated characteristics that can be used to influence the coil selection and powering process. For example, in one embodiment, the WPT system may offer different options to the driver of vehicle 160 as part of driving parameters 802 that can be selected. These charging options may be based on the specific goal(s) of the driver of vehicle 160 such as, but not limited to, any or all of the following:

have at least M % full battery when arriving at a specific destination, assure that the battery of vehicle 160 never falls below B % full level on the entire trip, arrive at the destination by time T and, therefore, drive faster to arrive in time and be willing to pay extra to be able to support the higher speed to arrive in time, stop at a static charging station if needed to charge.

Never pay over $X/kwh (kilowatt-hour)

In turn, the WPT system may also specify the different regional options to the driver of vehicle 160 such as:

Get all N units of energy in region 1 at cost 10

Get N/2 units of energy in region 1 @ cost 10 and remaining N/2 units in region 2 @ cost 7.

Get 0 units in region 1 and all N units in region 2 at cost 5.

The route and energy optimization would then take into account the above goals and physical and monetary constraints to determine the best route.

Note that while autonomous vehicles can take the greatest advantage of the techniques herein, the techniques can also be used to control traffic that includes non-autonomous vehicles. For example, in the case of a non-autonomous vehicle, a display can show suggested speed to the driver for optimum power transfer. The actual communication channel used for this purpose could either be direct to the vehicle from the central cloud entity or it could be communicated to the vehicle through the roadside infrastructure.

Figure 9:
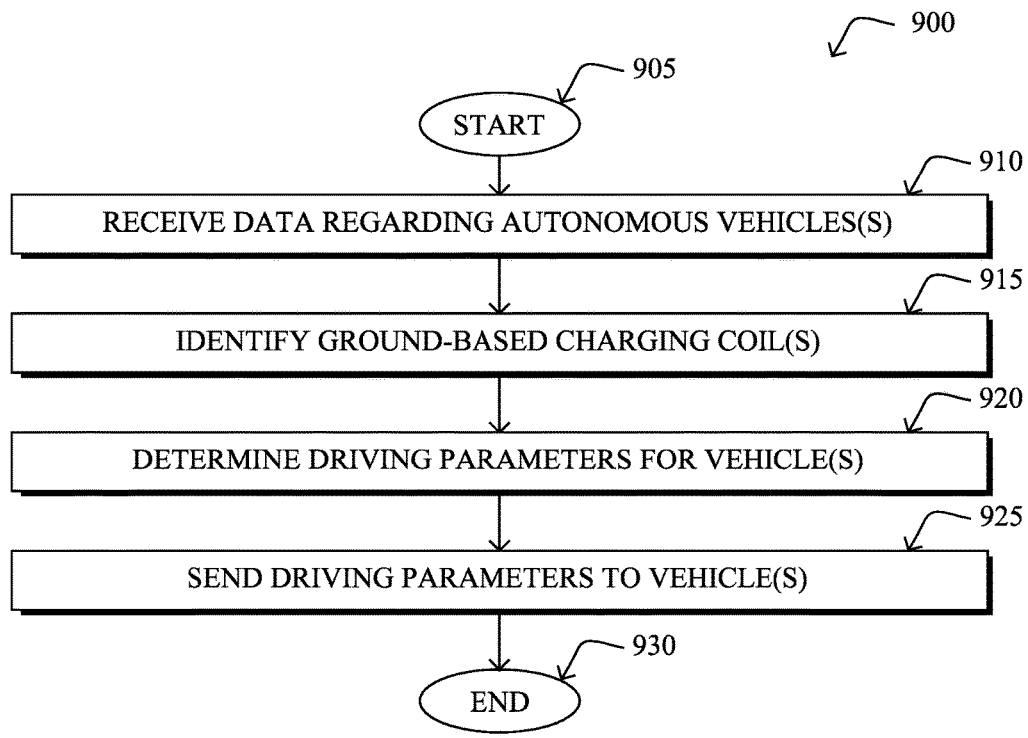
FIG. 9 illustrates an example of providing intelligent vehicle control with respect to a WPT system.

FIG. 9 illustrates an example simplified procedure for powering a ground-based charging coil, in accordance with one or more embodiments described herein. For example, a non-generic, specifically configured device (e.g., device 200) may perform procedure 900 by executing stored instructions (e.g., process 248). The procedure 900 may start at step 905, and continues to step 910, where, as described in greater detail above, the device may receive vehicle characteristic data regarding one or more autonomous vehicles. In various embodiments, each of the one or more autonomous vehicles is equipped with a vehicle-based charging coil configured to receive electrical power from a ground-based charging coil of a wireless power transfer (WPT) system.

At step 915, as detailed above, the device may, based on the received vehicle characteristic data, one or more ground-based charging coils of the WPT system available to provide power to the one or more autonomous vehicles. For example, assume that the vehicles are traveling along a certain road and at a certain speed, as specified in the received vehicle characteristics. In such a case, the device may identify one or more upcoming ground-based charging coils that the vehicles can traverse, thereby providing energy to at least one of the vehicles.

At step 920, the device may determine driving parameters for the one or more vehicles to optimize power transfer from the one or more ground-based charging coils to the one or more vehicles, as described in greater detail above. In various embodiments, these driving parameters may control the speed, vehicle spacing, and/or route taken by one or more of the vehicles. Notably, the driving parameters may be selected to optimize the power transfer such that an identified ground-based charging coil has at least enough time to charge in advance of a vehicle arriving at the coil for charging.

At step 925, as detailed above, the device may send the driving parameters to the one or more vehicles, to control movement of the one or more vehicles. For example, in the case of an autonomous vehicle, the driving parameters may cause the vehicle to accelerate or decelerate to a determined speed, move from one lane or route to another, increase or decrease its spacing with one or more other vehicles, or take any other measure that may optimize the power transfer by the WPT system. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Therefore, the techniques herein can leverage information from the network to optimize the recovery times of the ground-based coils and maximize power transfers to the EVs, thereby intelligently controlling the vehicle traffic over the WPT coils.

While there have been shown and described illustrative embodiments that provide for intelligent vehicle control in a WPT system, it is to be understood that various other adaptations and modifications may be made within the spirit and scope of the embodiments herein. For example, while the techniques herein are described particularly with respect to automobiles, the techniques herein can be applied to any known form of vehicle, such as autonomous vehicles, aerial vehicles, drones, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device in a network, vehicle characteristic data regarding one or more autonomous vehicles, wherein each autonomous vehicle of the one or more autonomous vehicles is equipped with a vehicle-based charging coil configured to receive electrical power from a ground-based charging coil of a wireless power transfer (WPT) system;
   identifying, by the device and based on the received vehicle characteristic data, one or more ground-based charging coils of the WPT system available to provide power to the one or more autonomous vehicles;
   determining, by the device, driving parameters for the one or more autonomous vehicles to optimize power transfer from the one or more ground-based charging coils to the one or more autonomous vehicles; and
   sending, by the device, the driving parameters to the one or more autonomous vehicles to control movement of the one or more autonomous vehicles.

2. The method as in claim 1, wherein the determining the driving parameters for the one or more autonomous vehicles comprises:
   determining, by the device, a minimum amount of time needed to power a particular ground-based charging coil after the particular ground-based charging coil transfers power to a first autonomous vehicle of the one or more autonomous vehicles.

3. The method as in claim 2, wherein the determining the driving parameters for the one or more autonomous vehicles further comprises:
   determining, by the device, an optimal speed for a second autonomous vehicle of the one or more autonomous vehicles, based on the minimum amount of time needed to power the particular ground-based charging coil after the particular ground-based charging coil transfers power to the first autonomous vehicle of the one or more autonomous vehicles.

4. The method as in claim 2, wherein the determining the driving parameters for the one or more autonomous vehicles further comprises:
   determining, by the device, an optimal spacing between the first autonomous vehicle of the one or more autonomous vehicles and a second autonomous vehicle of the one or more autonomous vehicles, based on the minimum amount of time needed to power the particular ground-based charging coil after the particular ground-based charging coil transfers power to the first autonomous vehicle of the one or more autonomous vehicles.

5. The method as in claim 1, wherein the received vehicle characteristic data is indicative of a non-charging vehicle in proximity of the one or more autonomous vehicles, and wherein the determining the driving parameters comprises:
   determining, by the device, a spacing between a first autonomous vehicle of the one or more autonomous vehicles and the non-charging vehicle.

6. The method as in claim 1, wherein the determining the driving parameters for the one or more autonomous vehicles comprises:
   using, by the device, a machine learning model that receives a feedback regarding optimizing the power transfer.

7. The method as in claim 1, wherein the determining the driving parameters for the one or more autonomous vehicles comprises:
   selecting, by the device, one or more routes to be taken by the one or more autonomous vehicles.

8. The method as in claim 1, further comprising:
   providing, by the device, an indication of the driving parameters to a non-autonomous vehicle.

9. The method as in claim 1, wherein the identifying the one or more ground-based charging coils of the WPT system comprises:
   identifying, by the device, one or more ground-based charging coils of the WPT system that are located with a predefined physical region.

10. An apparatus, comprising:
    one or more network interfaces to communicate with a network;
    a processor coupled to the one or more network interfaces and configured to execute one or more processes; and
    a memory configured to store a process executable by the processor, the process when executed configured to:
      receive vehicle characteristic data regarding one or more autonomous vehicles, wherein each autonomous vehicle of the one or more autonomous vehicles is equipped with a vehicle-based charging coil configured to receive electrical power from a ground-based charging coil of a wireless power transfer (WPT) system;
      identify, based on the received vehicle characteristic data, one or more ground-based charging coils of the WPT system available to provide power to the one or more autonomous vehicles;
      determine driving parameters for the one or more autonomous vehicles to optimize power transfer from the one or more ground-based charging coils to the one or more autonomous vehicles; and
      send the driving parameters to the one or more autonomous vehicles to control movement of the one or more autonomous vehicles.

11. The apparatus as in claim 10, wherein the apparatus determines the driving parameters for the one or more autonomous vehicles by:
    determining a minimum amount of time needed to power a particular ground-based charging coil after the particular ground-based charging coil transfers power to a first one of the autonomous vehicles.

12. The apparatus as in claim 11, wherein the apparatus determines the driving parameters for the one or more vehicles by:
    determining an optimal speed for a second one of the vehicles, based on the minimum amount of time needed to power the particular ground-based charging coil after the coil transfers power to a first autonomous vehicle of the one or more autonomous vehicles.

13. The apparatus as in claim 11, wherein the apparatus determines the driving parameters for the one or more autonomous vehicles by:
   determining an optimal spacing between the first autonomous vehicle of the one or more autonomous vehicles and a second autonomous vehicle of the one or more autonomous vehicles, based on the minimum amount of time needed to power the particular ground-based charging coil after the particular ground-based charging coil transfers power to the first autonomous vehicle of the one or more autonomous vehicles.

14. The apparatus as in claim 11, wherein the apparatus determines the driving parameters for the one or more autonomous vehicles by:
   determining a lane or lane alignment for a particular autonomous vehicle of the vehicles that maximizes overlap between the vehicle-based charging coil of the particular autonomous vehicle and the ground-based charging coil.

15. The apparatus as in claim 10, wherein the received vehicle characteristic data is indicative of a non-charging vehicle in proximity of the one or more autonomous vehicles, and wherein the apparatus determines the driving parameters by:
   determining a spacing between a first autonomous vehicle of the one or more autonomous vehicles and the non-charging vehicle.

16. The apparatus as in claim 10, wherein the apparatus determines the driving parameters for the one or more autonomous vehicles by:
   using a machine learning model that receives a feedback regarding optimizing the power transfer.

17. The apparatus as in claim 10, wherein the process when executed is further configured to:
   provide an indication of the driving parameters to a non-autonomous vehicle.

18. The apparatus as in claim 10, wherein the apparatus identifies the one or more ground-based charging coils of the WPT system by:
   identifying one or more ground-based charging coils of the WPT system that are located with a predefined physical region.

19. The apparatus as in claim 10, wherein the apparatus comprises a fog computing capable road side unit.

20. A tangible, non-transitory, computer-readable medium storing program instructions that cause a device to execute a process comprising:
   receiving, at the device, vehicle characteristic data regarding one or more autonomous vehicles, wherein each autonomous vehicle of the one or more autonomous vehicles is equipped with a vehicle-based charging coil configured to receive electrical power from a ground-based charging coil of a wireless power transfer (WPT) system;
   identifying, by the device and based on the received vehicle characteristic data, one or more ground-based charging coils of the WPT system available to provide power to the one or more autonomous vehicles;
   determining, by the device, driving parameters for the one or more autonomous vehicles to optimize power transfer from the one or more ground-based charging coils to the one or more autonomous vehicles; and
   sending, by the device, the driving parameters to the one or more autonomous vehicles to control movement of the one or more autonomous vehicles.

* * * * *

UNITED STATES PATENT AND TRADEMARK OFFICE
CERTIFICATE OF CORRECTION

Page 1 of 1

PATENT NO.         : 10,369,893 B2
APPLICATION NO.    : 15/790687
DATED              : August 6, 2019
INVENTOR(S)        : Moghe et al.

It is certified that error appears in the above-identified patent and that said Letters Patent is hereby corrected as shown below:

In the Specification

Column 12, Line 21, please amend as shown:
for vehicle 160 to be ready to receive the next charge.

Signed and Sealed this
Twenty-fourth Day of March, 2020

Andrei Iancu
*Director of the United States Patent and Trademark Office*